May 12, 1970

C. P. SAYLOR 3,511,028

CONTINUOUS GAS-LIQUID CHROMATOGRAPHY METHOD
UTILIZING ANNULAR OPEN COLUMNS
Filed Jan. 15, 1969

INVENTOR
Charles Proffer Saylor

BY

AGENT

United States Patent Office 3,511,028
Patented May 12, 1970

3,511,028
CONTINUOUS GAS-LIQUID CHROMATOGRAPHY METHOD UTILIZING ANNULAR OPEN COLUMNS
Charles Proffer Saylor, Adelphi, Md., assignor to the United States of America as represented by the Secretary of Commerce
Filed Jan. 15, 1969, Ser. No. 791,359
Int. Cl. B01d 15/08
U.S. Cl. 55—67                    8 Claims

ABSTRACT OF THE DISCLOSURE

The method which comprises: flowing a carrier gas through an annular open (unpacked) column, at least one wall of which is coated with a separation liquid and rotated about its axis, while constraining the gas to flow substantially parallel to the axis of the column; introducing a gaseous mixture to be separated into the column inlet at a fixed point; and withdrawing the components of the mixture from the column outlet at angularly spaced fixed points. The constraining of the carrier gas to flow parallel to the column axis may be effected by providing at least one elongated thin gas barrier in the column, or by rotating the column walls at different angular velocities, including rotating the walls in opposite directions. The walls may be coated with different separation liquids to separate a gaseous mixture of three or more components which are difficult to separate with any single separation liquid.

FIELD OF THE INVENTION

This invention relates to continuous gas-liquid chromatography, and more particularly to continuous gas-liquid chromatography involving annular open columns.

DESCRIPTION OF THE PRIOR ART

The prior art includes continuous gas-liquid chromatographs that utilize an annular packed column, or an annular array of packed tubes: see for example U.S. Pats. 2,891,630; 3,187,486; and 3,257,781. The packed column, or the array of packed tubes, typically is rotated about its axis, while carrier gas is forced through the packing. The gaseous mixture to be separated is introduced into the annular packing at a fixed point at the inlet end of the column, and the components of the mixture are withdrawn from the column outlet at angularly spaced fixed points. These prior chromatographs are relatively slow, and must be operated at relatively high carrier gas pressures, because of the constriction of the packing. Moreover, the chromatographs have relatively poor resolutions and efficiencies, because of the inevitable nonuniformities in the packings and, in the case of the packed annular column, the lateral diffusion of the components in the packing.

SUMMARY OF THE INVENTION

The present invention provides high speed, high resolution operation at low carrier gas pressures, thereby greatly improving upon the prior chromatographs. The improved operation is essentially accomplished by utilizing an unpacked or open, liquid-coated, annular column; flowing carrier gas through the column; and rotating at least one of the liquid-coated walls while constraining the carrier gas to flow substantially parallel to the axis of the column.

DETAILED DESCRIPTION

Figure 1:
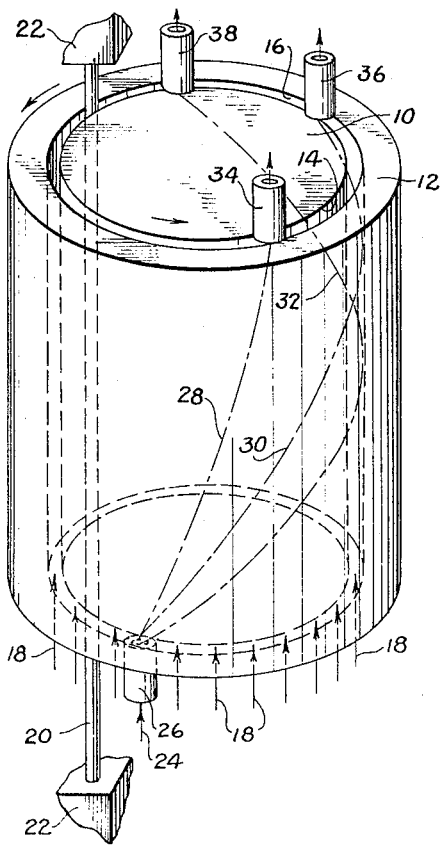
FIG. 1 is a perspective view of one embodiment of the invention.
Figure 2:
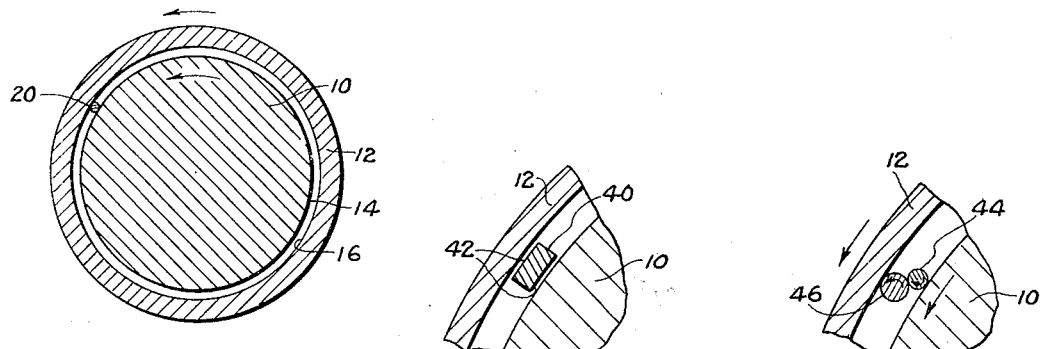
FIG. 2 is a cross section of the apparatus shown in FIG. 1.

In the embodiment of the invention that is illustrated in FIGS. 1 and 2, a cylinder 10 is coaxially disposed within a hollow cylinder 12 to provide an open chromatographic column having an annular cross section. The confronting walls 14, 16 of the cylinders 10, 12 are each coated with a thin film of a separation liquid, and the cylinders 10, 12 are rotated at identical angular velocities about the common axis of the cylinders. Carrier gas 18 is flowed into the column uniformly around the column, and is constrained to flow substantially parallel to the axis of the column by a wire or rod 20 disposed parallel to the axis between the walls 14, 16. The rod 20 is stretched taut and its ends are secured to spatially fixed wall members 22. The diameter of the rod 20 is slightly less than the spacing between the rotating walls 14, 16 to provide an effective gas barrier to rotatory movement of the gas 18, thereby preventing the gas 18 from following helical paths through the column due to the rotation imparted to the gas by the rotating walls 14, 16. The fixed rod 20 should not disturb the coatings on walls 14, 16.

With the liquid-coated walls 14, 16 rotating at uniform, equal velocities and the carrier gas 18 flowing uniformly and axially between the walls, a stream 24 of the gaseous mixture to be separated is introduced into the inlet of the column through a spatially fixed conduit 26. The components of the mixture are urged through the column by the axially-flowing carrier gas 18; and are retained, and hence rotated, at different rates by the separation liquid on the rotating walls 14, 16. Consequently the components of the feed mixture 24 follow different helical paths 28, 30, 32 through the column, and are withdrawn at the outlet of the column by angularly spaced, spatially fixed effluent conduits 34, 36, 38.

From the foregoing, those skilled in the art will recognize the advantages of the annular open column over the prior annular packed columns. The open column provides faster and more highly resolved separations, by eliminating the tortuous and nonuniform passageways of the packed column. With presently available machining equipment, it is possible to form the radii and concentricities of the walls 14, 16 of the cylinders 10, 12 within very close tolerances, thereby providing an extremely uniform annular column. The open column of this invention also operates effectively at pressures only slightly above atmospheric, thereby eliminating the need for costly, heavy, high-pressure jacketing of the column, and increasing the safety of the operation thereof.

Figure 3:
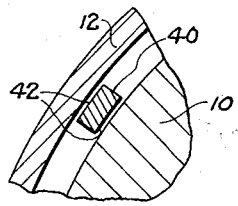
FIGS. 3 and 4 are enlarged views of portions of cross sections of two alternative embodiments of the invention.
Figure 4:
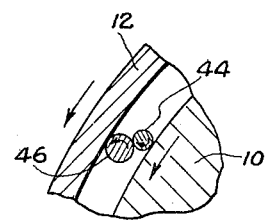

In FIGS. 1 and 2, the carrier gas 18 is constrained to flow axially through the rotating column by means of a stretched wire or rod 20 disposed parallel to the column axis. At high angular velocities, it may be desirable to provide additional rods 20 (not shown) about the column to further channel the carrier gas in the axial direction. Further, it may be desirable to change the cross sectional configuration of the rod (or rods) 20, to reduce the leakage paths therearound. For example, as shown in FIG. 3, by forming the barrier as a bar 40 of generally rectangular cross section but arched to conform with the inner and outer radii of the annular column, the leakage paths 42 are greatly constricted, permitting little carrier gas to be rotated by the walls 14, 16. The leakage paths can be eliminated (to achieve maximum resolution) by providing the barrier illustrated in FIG. 4, which comprises a pair of elongated rollers 44, 46 each journalled at its ends for rotation about its axis. In operation, each roller rolls on its associated column wall and on the other roller, thereby completely blocking the column to rotational movement of the carrier gas. The diameters of the rollers 44, 46 are selected so that they properly "mesh" with the rotating cylinders 10, 12.

Figure 5:
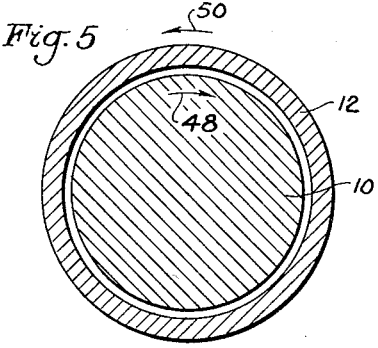
FIG. 5 is a cross section of still another embodiment of the invention.

FIG. 5 illustrates another method for constraining the carrier gas to flow substantially axially through the column. In this method, the inner cylinder 10 and outer cylinder 12 are rotated at approximately equal speeds, but in opposite directions 48, 50, so that the net rotation imparted to the carrier gas is approximately zero. In this mode of operation, ordinarily only one of the cylindrical walls 14, 16, is coated with the separation liquid, and the components of the feed mixture are retarded and rotated in only one direction (if the components were equally retarded in opposite directions there would be no separation of the components). However, both of the walls 14, 16 may be coated, but with two different separation liquids. This arrangement will then separate feed mixtures having three or more components A, B, C . . . which normally must be separated in two steps with two liquids X, Y: liquid X separates two components A, B from the remaining components C . . . , and liquid Y separates component A from component B. By coating the walls 14 and 16 with the liquids X and Y, respectively, the above two separations are performed simultaneously, thereby reducing the time and cost of separating the feed mixture.

In the apparatus shown in FIG. 5, it is necessary to journal each of the cylinders 10, 12 for rotation, and to rotate the cylinders with separate drive means. In the event that the selected rotational speeds are low (near zero), and the carrier gas flow rate is relatively high, either of the cylinders 10, 12 may be made stationary, thereby eliminating the journals and drive means for this cylinder. The fixed cylinder constrains the carrier gas to a substantially axial flow through the column by "braking" the rotation imparted to the gas by the rotating cylinder. In use, when a single separation liquid is used, it is applied to the rotating wall of the column; and when the two different separation liquids X, Y described above are used, liquid X which separates components A and B from the remaining components is applied to the rotating wall, and liquid Y which separates components A and B is applied to the fixed wall, whereby the fixed liquid differentially retards the rotation of the components A and B, thereby effecting the spatial separation thereof.

I claim:

1. The continuous gas-liquid chromatographic method which comprises:

flowing a carrier gas through an annular open column, at least one wall of which is coated with a separation liquid and rotated about its axis, while constraining the gas to flow substantially parallel to the axis of the column without rotating about said axis;

introducing a gaseous mixture to be separated into the column at a fixed point on the end of said column into which said carrier gas is flowed; and withdrawing the components of said mixture from the column at fixed angularly spaced points on the other end of said column.

2. The method set forth in claim 1, wherein said constraining comprises providing at least one elongated thin gas barrier in the annular column parallel to the column axis, said barrier being fixed relative to said axis.

3. The method set forth in claim 2, wherein said barrier comprises a rod disposed in said column parallel to said column axis and stretched taut between a pair of fixed supports disposed at opposite ends of said column.

4. The method set forth in claim 2, wherein said barrier has a generally rectangular cross section, to construct the leakage paths therearound.

5. The method set forth in claim 2, wherein said barrier comprises a pair of rollers disposed in said column parallel to said column axis and journalled at their ends in a pair of fixed supports disposed at opposite ends of said column, each roller of said pair of rollers being arranged to roll on one of the walls of said column and on the other roller of said pair of rollers, so as to completely block the column to rotational movement of said carrier gas.

6. The method set forth in claim 1, wherein said constraining comprises rotating the walls of said annular column at different angular velocities.

7. The method set forth in claim 6, wherein said walls are rotated in opposite directions.

8. The method set forth in claim 6, wherein said walls are coated with different separation liquids, and said gaseous mixture contains three or more components, two of which are separated from the remainder by one of said liquids, said two components being separated by the other of said liquids.

References Cited

UNITED STATES PATENTS 3,038,326    6/1962    De Ford _____ 73—23.1 X

J. L. DE CESARE, Primary Examiner